United States Patent
Drobe (10) Patent No.: US 8,157,376 B2
(45) Date of Patent: Apr. 17, 2012

(54) MULTIFOCAL OPHTHALMIC EYEGLASS

(75) Inventor: Björn Drobe, Charenton-le-Pont (FR)

(73) Assignee: Essilor International (Compagnie General d'Optique), Charenton le Pont (FR)

( * ) Notice: Subject to any disclaimer, the term of this patent is extended or adjusted under 35 U.S.C. 154(b) by 89 days.

(21) Appl. No.: 12/573,835

(22) Filed: Oct. 5, 2009

(65) Prior Publication Data

US 2010/0085535 A1 Apr. 8, 2010

(30) Foreign Application Priority Data

Oct. 7, 2008 (FR) ...................................... 08 56802

(51) Int. Cl.
*G02C 7/06* (2006.01)
(52) U.S. Cl. ........................................ 351/177; 351/168
(58) Field of Classification Search .......... 351/168–172, 351/177
See application file for complete search history.

(56) References Cited

U.S. PATENT DOCUMENTS

| | | | |
|---|---|---|---|
| 1,955,047 | A | 4/1934 | Beach |
| 2007/0109494 | A1 | 5/2007 | Dreher |
| 2009/0153794 | A1* | 6/2009 | Iyer et al. ........................ 351/169 |

FOREIGN PATENT DOCUMENTS

| | | |
|---|---|---|
| EP | 0 367 878 | 5/1990 |
| EP | 0 445 944 | 9/1991 |
| EP | 1 703 313 | 9/2006 |
| EP | 1 959 294 | 8/2008 |
| JP | 01243017 A * | 9/1989 |
| WO | WO 03/054616 | 7/2003 |

OTHER PUBLICATIONS

Schuldt, Stefanie "ysis—Naturliches sehen erleben", pp. 38-43, May 2004.
Cheng, Arthur et al., "Assessment of pupil size under different light intensities using the Procyon pupillometer", Journal Cataract and Refractive Surgery, Fairfax, VA, vol. 32, No. 6, pp. 1015-1017, Jun. 1, 2006.

* cited by examiner

*Primary Examiner* — Scott J Sugarman
(74) *Attorney, Agent, or Firm* — Cozen O'Connor (57) ABSTRACT

A multifocal ophthalmic eyeglass (1) corrects a wearer's vision for a first vision distance in a principal vision zone (10) of the eyeglass, and for at least two different second vision distances in a secondary vision zone (20) of said eyeglass. For this purpose, the secondary vision zone is divided into at least two series of alternating regions, each producing an ophthalmic correction suitable for one of the second vision distances. A presbyopic wearer provided with such an eyeglass can both read a book and view an obstacle on the ground equally well, for the same direction of his gaze through the secondary vision zone.

17 Claims, 7 Drawing Sheets

MULTIFOCAL OPHTHALMIC EYEGLASS

RELATED APPLICATIONS

This application claims the priority of French application Ser. No. 08/56802 filed Oct. 7, 2008.

FIELD OF THE INVENTION

The present invention relates to a method for producing a multifocal ophthalmic eyeglass.

It also relates to a multifocal ophthalmic eyeglass which can constitute a finished eyeglass, or a semi-finished eyeglass from which such a finished eyeglass can be produced.

BACKGROUND OF THE INVENTION

In a known manner, an ophthalmic eyeglass which is intended for a presbyopic wearer must produce appropriate ophthalmic corrections for several visual distances. For a long time multifocal or progressive eyeglasses which have different optical powers between distinct parts of these eyeglasses have been provided for this purpose. Such an eyeglass provides the wearer with an ophthalmic correction which is suited to the distance of a viewed object, if the direction of view of the wearer passes through the eyeglass in a part of the latter which has been provided for this visual distance. A wearer who has been newly fitted with such eyeglass must then get used to orienting his head and his eyes depending on the distance from the viewed object, in order to use the appropriate part of the eyeglass.

Nevertheless, such an orientation of the head and eyes may not be spontaneous, or may even be impossible in certain circumstances. In fact, the multifocal or progressive eyeglasses which are currently available are suitable for allowing the wearer to read by looking downwards. They are therefore suitable for reading a book which is placed on a table or resting on the knees in a sitting position. Thus, the ophthalmic correction which is produced in the lower part of these lenses is suitable for near vision, i.e. for a vision distance of approximately 0.4 m (meter). It is therefore unsuitable for viewing obstacles which are situated on the ground in front of the wearer, at a distance from the wearer's eyes which is greater than 0.5 m. Now, such a situation is that of approaching a staircase, for example. The image of the first steps of the staircase which is formed on the wearer's retina is then not clear, and the wearer can be the victim of an accident caused by this poor visual perception. Another example of a situation for which current multifocal or progressive eyeglasses are not suitable is reading a page of script which is attached to a wall, at eye level. In fact, the wearer is then compelled to read the document through the far vision zone of his spectacle eyeglasses.

The document EP 0 367 878 describes an eyeglass with concentric zones which have several focal distance values at any point on its surface. Such an eyeglass can simultaneously provide two ophthalmic correction values, for example for far vision and for near vision, irrespective of the direction of view through the eyeglass. But, because part of the optical power is contributed by light diffraction effect, such eyeglass has significant chromatism. The effective optical power of the eyeglass cannot then be matched precisely for all the colours with respect to the spherical defect which is determined for an ametropic subject. Moreover, irrespective of the distance of the object which is viewed by the wearer of such eyeglass, and irrespective of the direction of his view through the eyeglass, part of the light which enters via the pupil converges according to a focal distance which is not appropriate. This light part does not then participate in the clear image which is produced on the wearer's retina according to whichever of the focal distances is appropriate. This results in a loss of contrast which affects the wearer's vision in all circumstances.

SUMMARY OF THE INVENTION

An object of the present invention is therefore to provide a novel ophthalmic eyeglass for a presbyopic wearer, which does not have the drawbacks of previous eyeglasses.

For this purpose, one aspect of the invention is directed to a method for producing a multifocal ophthalmic eyeglass intended for an identified wearer, which comprises the following steps:

/1/ obtaining a first ophthalmic correction of the wearer for a first vision distance, and at least two second ophthalmic corrections of the wearer respectively for at least two second vision distances, these two second corrections being different from each other;

/2/ determining a principal vision zone and a secondary vision zone of the eyeglass;

/3/ dividing the secondary vision zone into at least two series of regions, the regions being contiguous and alternating with respect to the series with a pitch which is less than or equal to 1 mm;

/4/ determining first parameters of the eyeglass in the principal vision zone, which correspond to the first ophthalmic correction, and, for each series of regions, determining second parameters of the lens in the regions of this series as a function of one of the second ophthalmic corrections which has been obtained in step /1/ and which is assigned to this same series of regions; and /5/ producing the eyeglass according to the first and second parameters.

Thus, an eyeglass according to the invention produces, in his principal vision zone, an ophthalmic correction which is suited to the wearer for the first vision distance. All or almost all the light which passes through the wearer's pupil and which forms an image on his retina then passes through the principal vision zone of the eyeglass, so that the image of the viewed object has maximum contrast. The wearer's vision is therefore optimally corrected for the first vision distance when the direction of his view passes through the principal vision zone, in particular close to a centre of the latter. For these vision conditions, the quality of ophthalmic correction provided by the multifocal eyeglass of the invention is therefore analogous to that of a unifocal eyeglass.

The eyeglass also possesses a secondary vision zone, with distinct parts of which are dedicated to ophthalmic correction for the wearer for several second visual distances. Such an assignment of regions inside the secondary vision zone, separately and respectively to the ophthalmic corrections established for several vision distances which are different, does not result from a diffractive effect. In this manner, the eyeglass has no significant chromatism. For example, the parameters of the eyeglass which are determined then applied in the regions of two different series can comprise an average curve of a face of the eyeglass and/or a light refractive index of a material of the eyeglass.

Moreover, given that the regions alternate with respect to the series with a pitch which is less than 1 mm (millimeter), the corrections, which are respectively suited to the different vision distances, are simultaneously available in the secondary vision zone. In fact, the alternating pitch of the regions with respect to the ophthalmic corrections which are produced is then less than the diameter of the wearer's pupil.

Thus, when the wearer's direction of view passes through the secondary vision zone of the eyeglass, one of the second corrections occurs when the object which is viewed by the wearer is situated substantially at the corresponding second vision distance. It then modifies the convergence of the light rays which pass through the eyeglass in one of the regions of the series which produces this second correction. But another of the second corrections also occurs when the wearer's direction of view passes through the eyeglass at the same place in the secondary vision zone, when the object which is viewed is situated substantially at another of the second vision distances. This last correction modifies other light rays which pass through the eyeglass in a second region of the series assigned to this other correction. The wearer can therefore perceive clear images of objects which are situated at different distances, even when he is looking on each occasion through the same place in the secondary vision zone of the eyeglass.

For example, the same lower part of the lens, when it is situated in the secondary vision zone provided by the invention, can provide the wearer with a near vision which is clear, in particular for a reading activity, and a vision of obstacles situated on the ground in front of the wearer which is also clear. Thus, the wearer has a vision perception which is clear in each circumstance.

In a general manner, the following variations can be envisaged, for lenses according to the invention:

- the principal vision zone and the secondary vision zone may have any relative positions in the eyeglass. In particular, one can surround the other, or extend only over one or more sides of the latter;
- the principal vision zone and the secondary vision zone may each be centred with respect to the eyeglass, or shifted overall with respect to a centre of the eyeglass in any direction;
- the number of series of regions, which are distinguished by the second ophthalmic corrections that they produce respectively in the secondary vision zone of the eyeglass, may vary. Preferably, the secondary vision zone is divided into two or three series of regions;
- one of the ophthalmic corrections may be zero. In other words, the optical power which is produced by the eyeglass in the corresponding zone or series of regions is zero;
- the first vision distance and one of the second vision distances may be identical. In this case, the corresponding ophthalmic corrections which are produced in the principal vision zone and in the regions of one of the series inside the secondary vision zone, are equal; and
- the alternating pitch of the first and second regions in the secondary vision zone may be constant or variable.

Preferably, the principal vision zone and the regions of each series are determined by variations of at least one parameter of one and same first surface of the ophthalmic lens. A second surface of the lens may then be modified once again in order to adapt the lens to the ophthalmic correction of the wearer, at least for the first vision distance. In this manner, identical semi-finished eyeglasses which determine the principal vision zone and the different series of regions inside the secondary vision zones can be used for wearers having ophthalmic corrections which are different for the first vision distance. The parameterr variations between the regions belonging to different series may form discontinuities of the first surface itself. A saving in thickness and a reduction in weight of the eyeglass may result from this. This first surface may be the convex front surface of the lens, or its concave rear surface. It may be also an intermediate surface between the front and rear surfaces of the eyeglass, which separates two transparent media having different light refractive index values.

Preferably also, the principal vision zone may contain a disc with a radius of 1 mm. It is then passed through by a significant proportion of the light rays which form an image on the wearer's retina, when the direction of view of the latter passes through or close to a centre of the principal vision zone. The contrast of the image on the wearer's retina is then more particularly increased.

According to a first improvement of the invention, a size and/or a position of the principal vision zone in the eyeglass may be adapted depending on the wearer, in particular depending on the postural habits of the latter. In this manner, the eyeglass may provide greater comfort, or reduce any initial time needed for the wearer to get used to it. In particular, the size and/or the position of the principal vision zone may be determined in step /2/ as a function of a principal activity of the wearer, using the first vision distance. Thus, it is not necessary for the wearer to modify the orientation of his head when engaged in this activity with a new eyeglass according to the invention.

Alternatively, the size of the principal vision zone may be determined as a function of a wearer's propensity to turn his head or eyes rather than changing his direction of view. In this case, step /2/ may comprise the following sub-steps:

/2-1/ characterizing an amplitude of a head movement of the wearer, which he makes while successively viewing objects which are situated in different directions; and /2-2/ determining the size of the principal vision zone of the eyeglass so that this size of principal vision zone decreases as a function of the amplitude of the head movement which has been characterized for the wearer.

In this manner, the secondary vision zone of the eyeglass, which provides clear vision for several different vision distances, may be closer to a point central of the principal vision zone which is much used by a wearer who mainly turns his head when changing his direction of view. By contrast, the principal vision zone may be larger for a wearer who turns his eyes rather than his head. Thus, irrespective of the wearer's propensity rather to turn his head or eyes, his vision can be corrected in a manner which is appropriate for several visual distances, at eccentricity values which are as low as possible so as not to disturb his usual manner of changing his direction of view.

According to a second improvement of the invention, a proportion of the regions of at least one series inside the secondary vision zone of the eyeglass may be determined as a function of an activity of the wearer using the second vision distance which is assigned to this series. As for the size of the principal vision zone, this proportion of the regions of the selected series may alternatively be determined as a function of the amplitude of the head movement which is made by the wearer, when he successively looks in different directions. It is determined so that a quotient of a sum of the surfaces of the regions of this series divided by a surface of a corresponding part of the secondary vision zone, increases as a function of the amplitude of the head movement made by the wearer.

In order to implement these improvements, the amplitude of the head movement which is made by the wearer may be characterized by carrying out the following sub-steps:

measuring an angle of rotation of the head of the wearer, when he successively views two objects which are situated in directions separated by an angle; and determining a value of a gain from a quotient between the angle which has been measured for the rotation of the wearer's head on the one hand, and the angular distance between the two directions of views on the other hand, this gain varying as an increasing function or as a decreasing function of the quotient.

In a general manner, a multifocal ophthalmic eyeglass according to the invention may be suitable for producing a correction of myopia or a correction of hyperopia of the far vision of the wearer.

In a particular embodiment of the invention, the secondary vision zone may be divided into two series of regions, with the first vision distance and any one of the second vision distances which may be equal. One of the second vision distances may be greater than 2 m, corresponding to the far vision of the wearer. Simultaneously, the other second vision distance may be comprised between 0.3 m and 0.5 m, corresponding to a near vision, or be comprised between 0.5 m and 2 m, corresponding to an intermediate vision distance. The spectacles eyeglass which is produced from the lens then produces a first optical power which is identical in the principal vision zone and in the regions of one of the series. It simultaneously produces a second optical power in the regions of the other series, which is different from the first optical power. Such an eyeglass therefore provides vision which is clear through the whole eyeglass for a first vision distance, and for a second vision distance through the secondary vision zone.

In another particular embodiment of the invention, the secondary vision zone may be divided into three series of regions, with the first vision distance and any one of the second vision distances which may be equal. One of the second vision distances may be comprised between 0.3 m and 0.5 m. It then correspond to the wearer's near vision. Simultaneously, another one of the second vision distances may be comprised between 0.5 m and 2 m, corresponding to an intermediate vision distance, and a last one of the second vision distances may be greater than 2 m, corresponding to the far vision. The spectacles eyeglass then produces a first identical optical power in the principal vision zone and in the regions of one of the series. It simultaneously produces two second different optical powers, respectively in the two other series of regions. Another such eyeglass therefore provides vision which is clear through the whole the eyeglass for a first vision distance, and for two other vision distances in the secondary vision zone.

The invention also proposes a multifocal ophthalmic lens, which comprises:
  a principal vision zone and a secondary vision zone; and
  at least two series of regions which form a partition of the secondary vision zone, these regions being contiguous and alternating with respect to the series with a pitch of less than 1 mm.

The lens is moreover adapted so that a spectacles eyeglass which is produced from the latter produces a first ophthalmic correction in the principal vision zone, and a second ophthalmic correction in the regions of each series. Moreover, these second corrections are different depending on the series of regions. Thus, the regions of the secondary vision zone of the eyeglass produce optical powers which are different from one series to another.

Such a lens can be produced, in particular, by using a method as described previously.

BRIEF DESCRIPTION OF THE DRAWINGS

Other features and advantages of the present invention will become apparent from the following description of non-limitative embodiment examples, with reference to the attached drawings in which.

DETAILED DESCRIPTION OF THE DRAWINGS

For the sake of clarity, the dimensions which appear in FIGS. 1a, 1b, 2a, 2b, 8a to 8b do not correspond to actual dimensions or to ratios between actual dimensions. Moreover, identical references which are indicated in different figures have identical meanings.

Figure 1A:
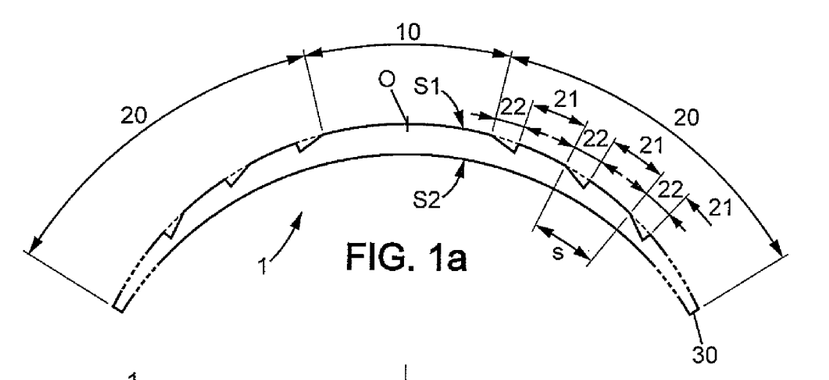
FIGS. 1a and 1b are two views of a first lens according to the invention, respectively in cross-section and in top view.
Figure 1B:
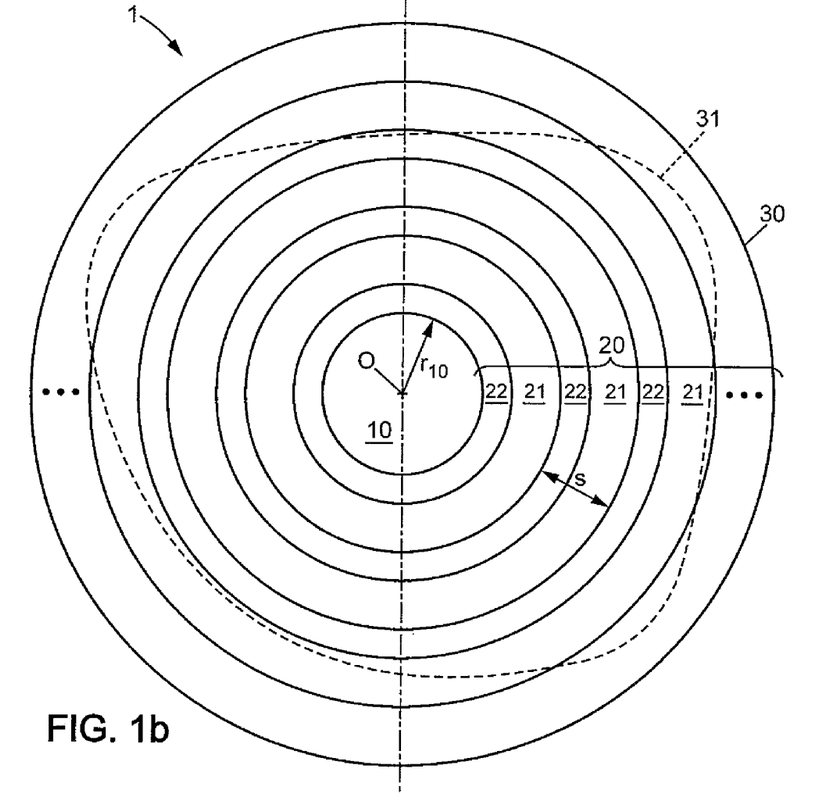

According to FIGS. 1a and 1b, an ophthalmic lens 1 comprises a front face S1 and a rear face S2. The front S1 and rear S2 faces are denoted thus with respect to the position of use of the lens 1 by a wearer of the latter. The lens 1 may form a semi-finished or finished eyeglass. By semi-finished eyeglass is meant a spectacles eyeglass blank, only one of the front or rear faces of which has a definitive shape. The other face is then subsequently machined, in particular in order to give the finished eyeglass optical power values which correspond to the ametropia which has been determined for the future wearer of the eyeglass. When the lens 1 is a semi-finished eyeglass, it has an initial peripheral edge 30 which may be circular with a diameter of 60 mm, for example. When it is a finished eyeglass, with its two faces S1 and S2 which are definitive, its peripheral edge may also be that of the semi-finished eyeglass. This edge may also have been cut out to the dimensions of an ophthalmic spectacles frame, in which the eyeglass is intended to be mounted. The contour 31 in FIG. 1b represents the edge of such a finished spectacles eyeglass after cutting out.

The lens 1 is divided into several zones parallel to one of the faces S1 or S2, including a principal vision zone 10 and a secondary vision zone 20. For example, the secondary vision zone 20 may surround the principal vision zone 10 inside the peripheral edge 30 or 31, but this is only a particular configuration by way of illustration, and FIGS. 8b to 8d described hereafter show other possible configurations. In particular, the secondary vision zone 20 may be limited to a reduced angular sector around or on one side of the principal vision zone 10. ○ denotes a central point of the principal vision zone 10. Initially it is assumed that the principal vision zone 10 is substantially centred in the lens, with respect to the peripheral edge 30 or 31. In this case, the point ○ may be merged with the fitting cross of the eyeglass, which is used as a reference point for positioning the eyeglass with respect to a spectacles frame in which it is intended to be mounted.

Preferably, the principal vision zone 10 may contain a disk with a radius of 1 mm.

Preferably also, the principal vision zone 10 may be contained in a disk with a radius of 7.5 mm. Thus, the secondary vision zone 20 provides the wearer with the second ophthalmic corrections which are suited to several vision distances, for eccentricity values from and greater than approximately 15° (degrees). Moreover, the secondary vision zone 20 has a surface which is wide enough for implementing the invention, even when the housing of the eyeglass in the frame is small.

The principal vision zone 10 is dedicated to a first correction of the wearer's ametropia, established for a first vision distance. Thus, the finished eyeglass which is produced from the lens 1 possesses a first optical power in the zone 10. This first optical power is in general constant throughout the zone 10.

The secondary vision zone 20 may be divided into two series of contiguous regions, which are referenced 21 or 22 according to whether they belong to the first or second of the two series, respectively. The regions 21 and 22 are alternating and dedicated respectively depending on the series to obtaining two ophthalmic corrections for the wearer of the finished eyeglass. Thus, the regions 21 are dedicated to obtaining a second correction of ametropia, and the regions 22 are dedicated to obtaining yet another correction of ametropia, which is different from the second correction.

According to the invention, the ophthalmic correction which is produced in the regions 21 of the first series on the one hand, and that which is produced in the regions 22 of the second series on the other hand, are established for the wearer for two vision distances which are different from each other. In this manner, an eyeglass according to the invention is of the multifocal type, and is particularly suitable for a presbyopic wearer. In certain particular embodiments of the invention, the second correction of ametropia which is produced by the eyeglass in the regions 21 may be identical to the first correction which is produced in the principal vision zone 10.

Each ophthalmic correction, and in particular the first ophthalmic correction which is produced in the principal vision zone 10, may be determined for the wearer in one of the ways known to a person skilled in the art. Optionally, the correction which is associated with one of the series of regions of the secondary vision zone 20 may be deduced from a combination of the first ophthalmic correction of the principal vision zone 10 with another of the second corrections which is produced in the regions of a different series. In all cases, all the ophthalmic corrections considered in the present invention relate to the wearer's foveal vision.

An eyeglass according to the invention is produced in the principal vision zone 10 according to a first set of parameters which corresponds to the first correction of ametropia. Similarly, it is produced in the regions of each series inside the secondary vision zone 20 according to a second set of parameters which correspond to one of the second corrections of ametropia. These second sets of parameters vary from one series to another, as a function of the corresponding ophthalmic corrections. All these parameters may be curvatures of one face of the lens 1, for example the face S1, in the corresponding regions or zones. In this case, the face S1 has discontinuities of curvature between two regions 21 and 22 which are contiguous, as well as between the principal vision zone 10 and those of the regions 21 or 22 which are contiguous with it. Optionally, these discontinuities of curvature may be superimposed on discontinuities in sagittal height, perpendicular to the face S1 (FIG. 1a).

The optical power of the finished eyeglass in the principal vision zone 10 is denoted $P_1$. That which is produced in the regions of one of the series, for example the regions 22, is denoted $P_2$. According to the parameters of the eyeglass in the regions 22, the optical power $P_2$ may be constant or vary according to a radial distance measured on the eyeglass from a reference point, for example the point O. Such a constancy or variation occurs from one region 22 to another, and optionally inside each region 22. For example, the optical power $P_2$ may firstly increase from the limit between the zones 10 and 20, in algebraic value and as a function of the eccentricity, until reaching a maximum value, then decreasing in the direction of the peripheral edge 30 or 31.

In the present description, the term eccentricity denotes an angle between the wearer's direction of view through the eyeglass and a reference direction which passes through a fixed point on the eyeglass. This fixed point may be the fitting cross which is printed on the eyeglass, and which corresponds in general to the direction of view straight ahead for the wearer. Consequently, the eccentricity of the wearer's direction of view through the eyeglass may be referenced by the radial distance on the eyeglass between the fitting cross and the point on the front face S1 of the eyeglass passed through by this direction of view. It is denoted E hereafter. For the sake of simplicity of a part of the description, it is firstly assumed that the centre O of the principal vision zone 10 coincides with the fitting cross of the eyeglass.

According to a first possibility, the value of the optical power $P_2$ inside the regions 22 may be the same in the entire secondary vision zone 20.

According to a second possibility, the absolute difference $|P_2-P_1|$ between the value of the optical power $P_2$ in the regions 22 on the one hand, and the value of the optical power $P_1$ in the principal vision zone 10 on the other hand, may vary progressively as a function of the eccentricity E. Such a variation therefore operates from a region 22 to another one of the same series by moving in the direction of the peripheral edge 30 or 31, and similarly inside each region 22.

According to yet a third possibility, the optical power $P_2$ may be constant inside each region 22, while the absolute difference $|P_2-P_1|$ varies between two successive regions 22 towards the peripheral edge 30 or 31.

It is understood that any one of the types of optical power variations which have just been described for the regions 22 may be implemented simultaneously, in a similar and independent fashion for each series of regions inside the secondary vision zone 20. In particular, the optical power may vary in the regions 21 in a different fashion to that in the regions 22.

Generally, the regions of one of the series inside the secondary vision zone 20 may each have at least one dimension which is comprised between 15 μm (micrometer) and 1000 μm, preferably between 25 μm and 50 μm. Thus, the partition of the secondary vision zone 20 between the regions 21 and 22 does not cause any significant diffraction, while remaining invisible or almost invisible to the naked eye. No discomfort therefore results for the wearer, and the eyeglass retains an aesthetic quality compatible with the requirements of the ophthalmic field.

The alternating pitch of the regions in the secondary vision zone is the distance of the interval between two successive regions belonging to one and same series. Thus, the alternating pitch of the regions 21 and 22 (FIGS. 1a and 1b) is the distance of the interval between two regions 21 which are separated by a single region 22. It is marked s in the Figures. The alternating pitch has local values in the secondary vision zone. It may be constant or vary inside this zone, while remaining less than 1 mm. Moreover, according to a preferred arrangement of the regions in the secondary vision zone 20, the regions 21, 22 of each series may be strips arranged in an angular sector around at least part of the principal vision zone 10. These strips of regions may then alternate in radial directions running from the centre of the part of the principal vision zone 10 towards the peripheral edge 30 or 31 of the eyeglass. In this case, the width of each strip of region 22 may be comprised between 15 μm and 1000 μm, preferably between 25 μm and 50 μm, in radial directions running from the centre O.

Figure 2A:
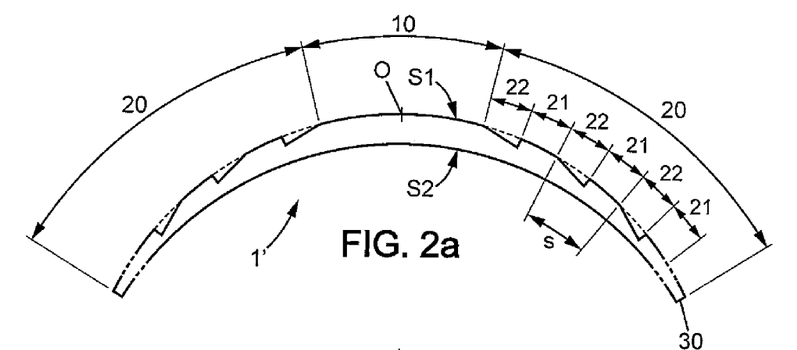
FIGS. 2a, 2b correspond respectively to FIGS. 1a and 1b for a second lens according to the invention.
Figure 2B:
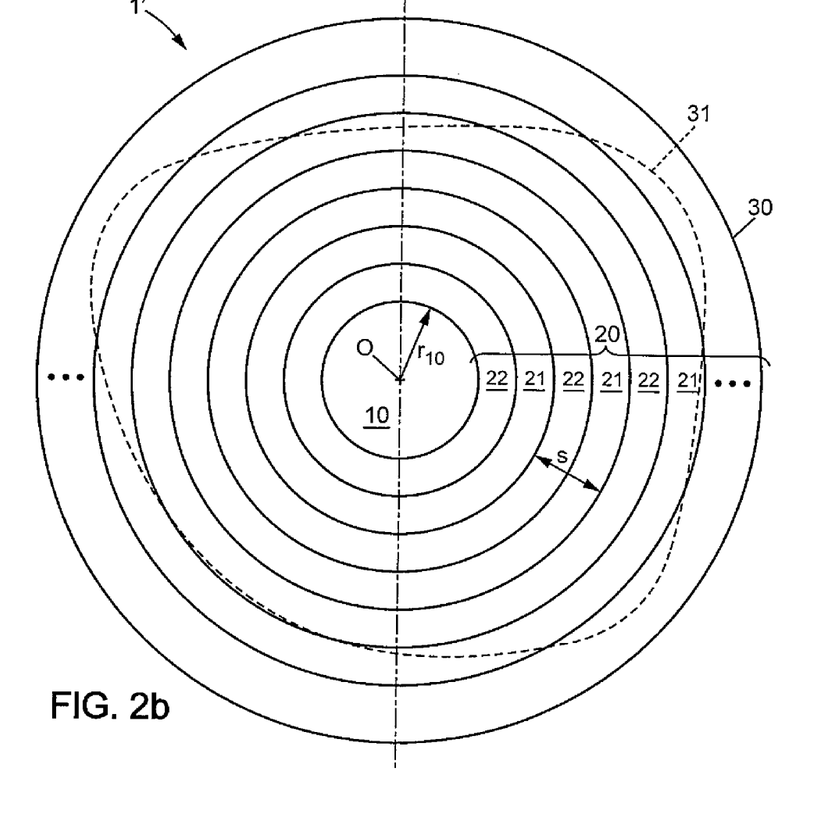

The lens of FIGS. 2a and 2b is overall denoted 1'. Lenses 1 and 1' have respective principal vision zones 10 which have identical dimensions. They are circular and centred on the same point O merged with the fitting cross, and have the same radius $r_{10}$. Simultaneously, the alternating pitch s of the regions 21 and 22 is identical for the lenses 1 and 1'. Lenses 1 and 1' are differentiated by the values of a period ratio of the regions 21 and 22. In the present description, by period ratio of the regions 22 is meant the quotient of the dimension of the regions 22 in the direction of alternation with the regions of one or more other series, divided by the local value of the alternating pitch s. This period ratio may be constant or vary in the secondary vision zone 20.

According to two improvements of the invention, the size of the principal vision zone 10 on the one hand, and the proportion of the regions of a selected series, for example the regions 22 in the secondary vision zone 20 on the other hand, may be adapted to the wearer of the eyeglass according to his propensity to turn the eyes or the head more when successively viewing objects which are in two different directions. It is understood that the size of the zone 10 and the proportion of the regions 22 may be adapted independently of each other. In particular, it is thus possible for the size of the zone 10 only, or the proportion of the regions 22 in the zone 20 only, to be adapted to the wearer.

Figure 3A:
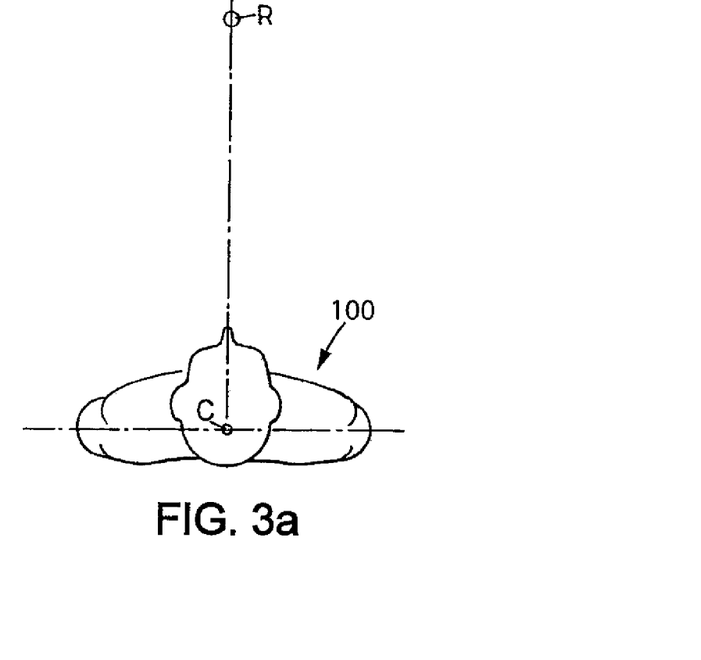
FIGS. 3a and 3b show a measurement principle for eye and head movements for a spectacle wearer.

To this end, the relative amplitudes of eye and head movements made by the wearer for whom the eyeglass is intended are firstly characterized. For this purpose, the wearer is asked to view a first target straight in front of him, called a reference target, positioning himself facing the latter. The reference target is denoted R in FIG. 3a, and the reference 100 denotes the wearer. Specifically, it can be located at eye height for the wearer. Thus the wearer positions himself in front of the reference target R, with his shoulders positioned approximately in a vertical plane which is perpendicular to the virtual line between his head and the reference target. His head and eyes are then oriented towards the reference target.

Starting from this position, the wearer 100 is then asked to look at a second target, called a test target and denoted T, offset with respect to the reference target R, without moving the shoulders. In order to do this, he turns his head partially and his eyes partially (FIG. 3b), so that the direction of his view passes from the reference target R to the test target T. Preferably, the test target T is offset horizontally with respect to the reference target R, in order to characterize the horizontal movements of the wearer's head and eyes.

Figure 3B:
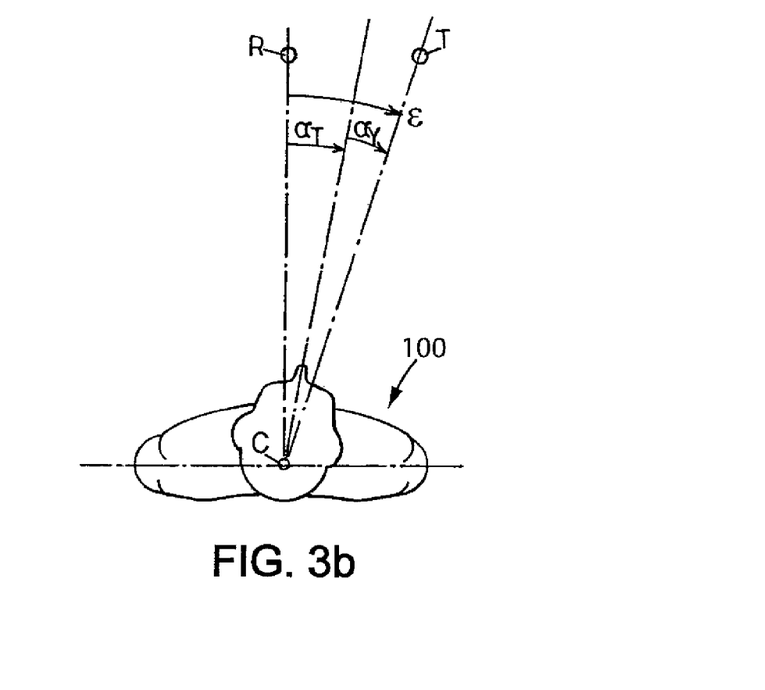

The angular distance between the test target T and the reference test R, with respect to the wearer 100, is denoted $\epsilon$. The centre C of rotation of the head is taken as a measurement point for the angles in a horizontal plane containing this point and the two targets R and T. In FIG. 3b, $\alpha_T$ denotes the angle of rotation of the head of the wearer 100, also called angular displacement of the head, in order to pass from the first position of viewing the reference target R to the second position of viewing the test target T. $\alpha_Y$ is the angle of rotation of the eyes performed at the same time by the wearer 100. The angular distance $\epsilon$ is thus equal to the sum of the two angles $\alpha_T$ and $\alpha_Y$. The eccentricity E of the wearer's view through the eyeglass as stated above in this description corresponds to the angle of angular displacement $\alpha_Y$.

The quotient of the angular displacement of the head $\alpha_T$ divided by the eccentricity E is then calculated. This quotient is equal to unity for a wearer who exclusively turned his head, in order to pass from the reference target R to the test target T, and zero for a wearer who only turned his eyes.

A gain G is then calculated for this "head/eye" movement coordination test carried out for the wearer 100. The gain G may be defined by a predetermined function of the quotient of the angular displacement of the head $\alpha_T$ divided by the angular distance $\epsilon$. For example, the gain G may be directly equal to the quotient of $\alpha_T$ divided by E: $G=\alpha_T/\epsilon$. A wearer who essentially turns the eyes to look at the test target (an "eye-mover") thus has a value for gain G close to zero, and a wearer who essentially turns his head to look at the same target (a "head-mover") has a value of G close to unity.

This "head/eye" movement coordination test may be performed by the wearer in the shop at the retail optician where he orders his pair of spectacles fitted with the eyeglass according to the invention. Other "head/eye" movement coordination tests equivalent to the one that has just been described may be carried out as an alternative, without any modification to the principle of implementation of the invention.

Figure 4:
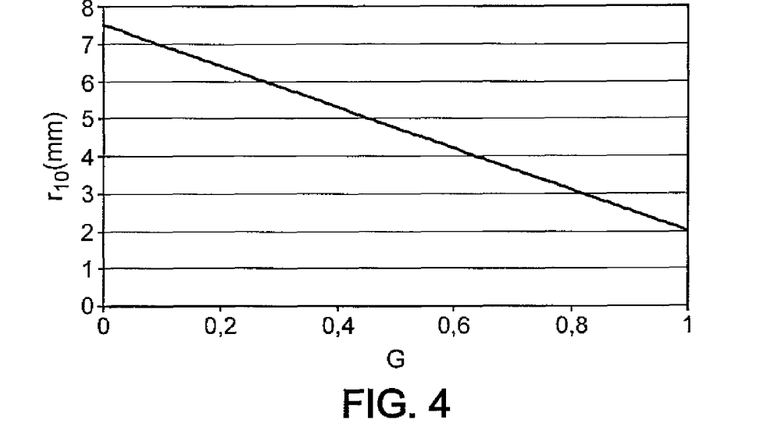
FIG. 4 is a diagram representing variations in a size of principal vision zone for an eyeglass according to the invention.

The diagram in FIG. 4 is an example of variation in the size of the principal vision zone 10 as a function of the gain G. By way of example, the zone 10 is also disk-shaped. The radius of this disk is denoted $r_{10}$ and is shown on the y axis. The possible values for the gain G are shown on the x axis. The variation of the radius $r_{10}$ may be linear, between a minimum value of 2 mm which is assigned when the gain G is equal to unity, and a maximum value of 7.5 mm which is assigned when the gain G is equal to zero. Thus, a size may be assigned to the principal vision zone 10, the size of which decreases the more the wearer moves his head when he looks successively in two different directions.

The proportion of the regions 22 in the secondary vision zone 20 may be an average or local variable. When it is an average proportion, or overall proportion, it is denoted $Q_{average}$ and defined as the quotient of the sum of the surfaces of the regions of the selected series—the regions 22—divided by a total surface of the secondary vision zone 20.

Several methods may be used in order to produce any value for the overall proportion $Q_{average}$ of the regions 22 in the secondary vision zone 20.

According to a first method, the strips of the regions of the selected series may have respective widths which are initially fixed over the entire secondary vision zone 20, according to the radial directions originating from the centre O. In this case, the proportion of the regions 22 in the zone 20 may be determined by selecting a value for the alternating pitch s. In other words, the strips of regions 22 may be further away from, or closer to, each other inside the zone 20. The value for the pitch s is then determined by the widths of the strips of regions which belong to series other than the one selected, namely the regions 21 in the example of FIGS. 1a and 1b. In particular, the strips of the regions 22 may all have identical widths in radial directions.

According to a second method, the strips of the regions of the selected series—the regions 22—may be distributed with an alternating pitch s which is initially fixed in the radial directions in the secondary vision zone 20. The proportion of the regions 22 in the zone 20 may then be determined by selecting a value for the period ratio of the strips of the regions 22. In particular, the alternating pitch s may be constant in the secondary vision zone 20. The lens of FIGS. 1a and 1b on the one hand, and the lens 1' of FIGS. 2a and 2b on the other hand, are distinguished from each other by such setting of the proportion of the regions 22 in the secondary vision zone 20.

The proportion of the regions 22 inside the secondary vision zone 20 may also be adjusted locally and vary between different points of the zone 20. Such a local value of the proportion is denoted $Q_{local}$. It is determined from a portion of the zone 20 which is reduced around a considered point, while containing portions of successive regions belonging to each series. The local proportion $Q_{local}$ may be determined in the same fashion as the overall proportion $Q_{average}$, by considering local values for the alternating pitch s and for the period ratio of the regions of the selected series with respect to the regions of one or other series.

In this case, the local proportion $Q_{local}$ of the regions 22 in the secondary vision zone 20 is preferably an increasing function of the eccentricity E of the direction of view through the eyeglass. In other words, the regions of the selected series—the regions 22—occupy an increasing proportion of the secondary vision zone 20, for radial distances on the eyeglass from the centre O of the zone 10 which are increasingly large.

Figure 5:
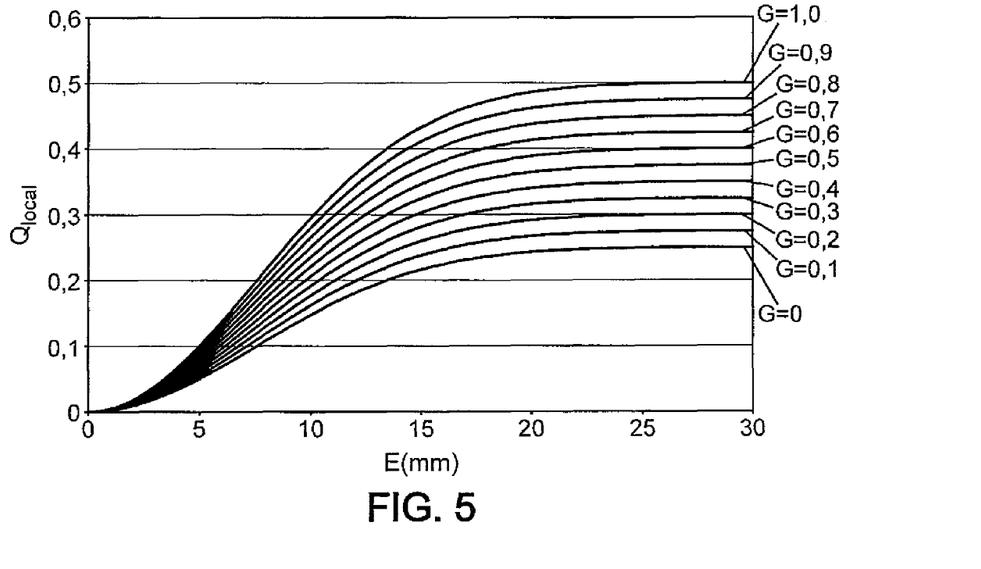
FIG. 5 is a diagram representing variations of a proportion of regions dedicated to an ophthalmic correction established for a determined vision distance, inside the secondary vision zone for a series of eyeglasses according to the invention.

The diagram of FIG. 5 represents such variations in the local proportion $Q_{local}$ of the regions 22 in the zone 20, for several possible values for the gain G. The values of the local proportion $Q_{local}$ are shown on the y axis, and the values of the eccentricity E of the view through the eyeglass are shown on the x axis. For a fixed value of eccentricity E, the local proportion $Q_{local}$ is moreover an increasing function of the value of the gain G. Consistently with this variation of the proportion of the regions 22 in the zone 20, the lens 1' of FIGS. 2a and 2b then corresponds to a greater value of the gain G, with respect to the lens 1 of FIGS. 1a and 1b.

Similarly, the overall proportion $Q_{average}$ may also be an increasing function of the value of the gain G.

A finished eyeglass in accordance with the invention can be produced from a semi-finished eyeglass, of which one from the front face S1 and the rear face S2 determines the principal vision zone 10 and the secondary vision zone 20, this latter being divided into at least two series of regions as has just been described. When the other face is machined according to a spherical or toric shape, the semi-finished eyeglass sets the differences between the ophthalmic corrections which will be produced by the finished eyeglass respectively in the principal vision zone and each series of regions. In this case, production of the eyeglass may comprise the following sub-steps:

selecting the semi-finished eyeglass, and
machining the other one of the front face S1 and the rear face S2 of the semi-finished eyeglass, so that the finished eyeglass produces the first ophthalmic correction in the zone 10.

As indicated above, the semi-finished eyeglass may be selected as a function of the size of the principal vision zone 10 and/or the proportion of the regions 22 in the zone 20, determined for the wearer. Its definitive face may be the front face S1, in particular.

Table 1 below summarizes the characteristics of four finished eyeglasses for presbyopics, according to the invention ($\delta$ denotes the diopter unit):

TABLE 1

|  | Eyeglass 1 | Eyeglass 2 | Eyeglass 3 | Eyeglass 4 |
|---|---|---|---|---|
| Radius $r_{10}$ of zone 10 | 10 mm | 15 mm | 5 mm | 6.5 mm |
| Number of series | 2 | 3 | 2 | 2 |
| Power $P_1$ in zone 10 | −4.00 $\delta$ | +2.00 $\delta$ | −6.00 $\delta$ | 0.00 $\delta$ |
| Power of the regions 21 | −4.00 $\delta$ | +2.00 $\delta$ | −6.00 $\delta$ | 0.00 $\delta$ |
| Power $P_2$ of the regions 22 | −2.00 $\delta$ | 0.00 $\delta$ | >−6.00 $\delta$ | +2.00 $\delta$ |
| Power of the regions 23 |  | +1.00 $\delta$ |  |  |
| Maximum value of $Q_{local}$ | 0.50 | 0.25/0.25 | 0.50 | 0.30 |
| Variation of $Q_{local}$ with E | constant | constant | constant | increasing |
| Difference $|P_2 - P_1|$ | 2.00 $\delta$ | 2.00 $\delta$ | variable | 2.00 $\delta$ |
| Radial width of the regions 22 | 50 μm | 25 μm | 50 μm | 25 μm |
| Radial width of the regions 23 |  | 25 μm |  |  |

The entire optical surface of the eyeglass 1 produces an ophthalmic correction for the far-vision wearer. This far-vision correction is equal to −4.00 $\delta$, and the addition is +2.00 $\delta$. The principal vision zone 10 of the eyeglass 1 may be located approximately at the centre of the eyeglass, and the secondary vision zone 20 may be located at least partially below the principal vision zone 10 with respect to the position of the eyeglass in use. The secondary vision zone 20 of the eyeglass 1 corrects both far vision and near vision. It thus allows the wearer both to read a book resting on a table and to see the ground in front of him clearly.

Figure 8A:
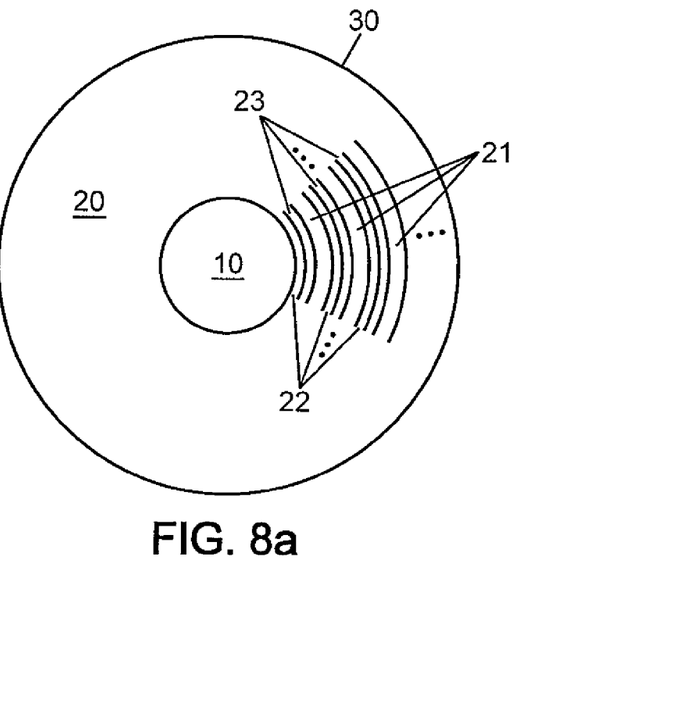
FIGS. 8a to 8d illustrate partitions of four eyeglasses according to the invention.

The entire optical surface of the eyeglass 2 corrects the wearer's near vision, and the secondary vision zone 20 moreover corrects the intermediate vision and the far vision. FIG. 8a shows the alternation between the three series of regions in the secondary vision zone 20. These are denoted respectively 21, 22 and 23. Moreover, Table 1 shows the respective constant values of the local proportion of the regions 22 and that of the regions 23 in the zone 20. These are both equal to 0.25, and are obtained by alternating strips of regions 21, 22 and 23 which have respective radial widths equal to 50 μm, 25 μm and 25 μm. The eyeglass 2 may allow the wearer to see a staircase in front of him clearly and to read a page of script which is attached to a wall at eye height.

Figure 6:
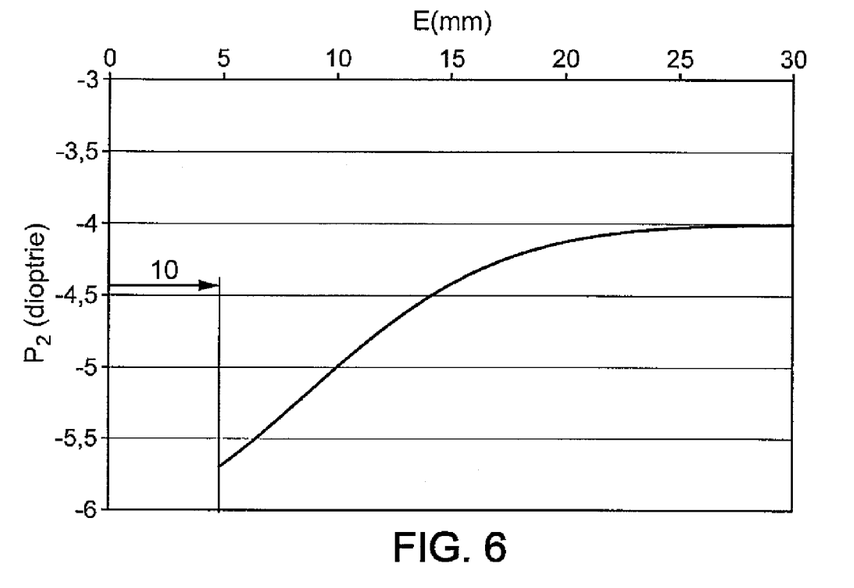
FIG. 6 is a diagram representing optical power variations in second regions of the secondary vision zone, for a particular example of an eyeglass according to the invention.

The eyeglass 3 is similar to eyeglass 1 as regards the zones in which the far and near vision of the wearer are corrected, with the exception that it corresponds to a first optical power $P_1$ which is different, and that the second optical power $P_2$ produced in the regions 22, varies. FIG. 6 shows these variations: the optical power $P_2$ increases progressively as a function of the eccentricity E, from the value −5.7 $\delta$ at the limit of the principal vision zone 10 up to the maximum value of −4.00 $\delta$.

Figure 7:
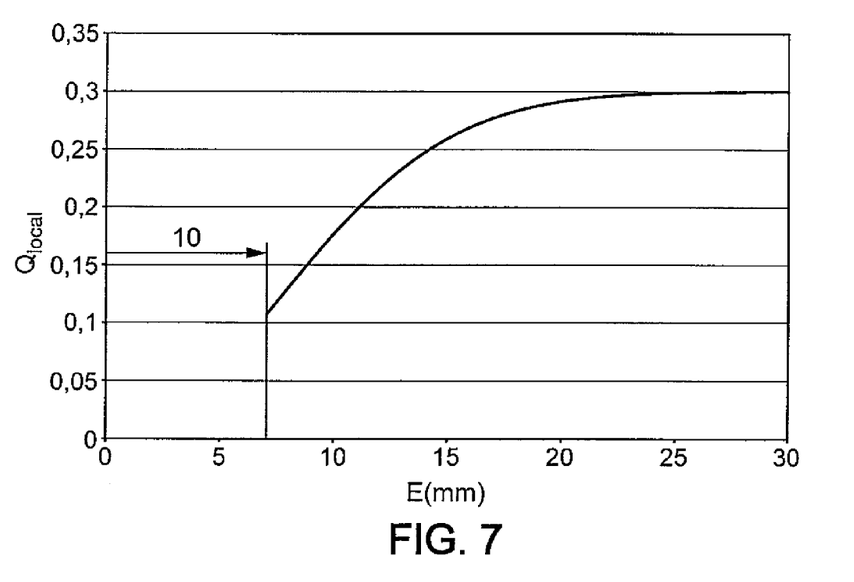
FIG. 7 corresponds to FIG. 5 for another particular example of an eyeglass according to the invention.

Finally, eyeglass 4 is also similar to eyeglass 1 in that it relates to the zones in which the near and far vision of the wearer are corrected, but the proportion of the regions 22 which are dedicated to near-vision correction inside the zone 20 increases with the eccentricity E. FIG. 7 reproduces these variations: $Q_{local}$ increases progressively from the value 0.11 at the limit of the principal vision zone 10, up to the maximum value 0.30.

The two diagrams of FIGS. 6 and 7 show the principal vision zone 10 but, due to the small radial dimensions of the regions 22, these do not appear in the parts of these curves corresponding to the secondary vision zone 20.

Figure 8B:
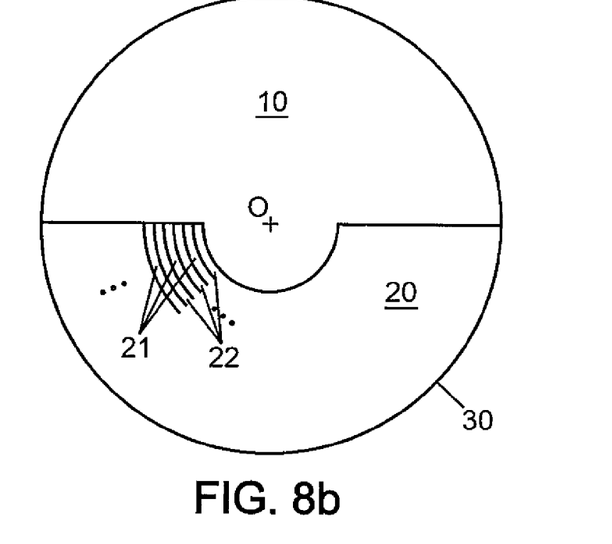
Figure 8C:
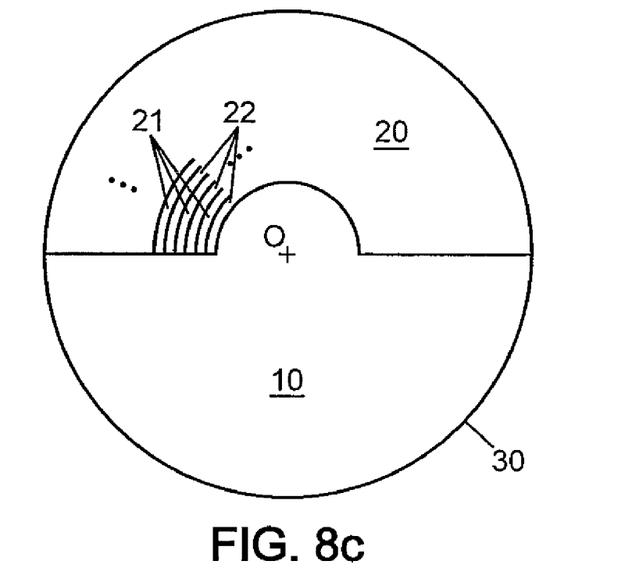

FIGS. 8*b* and 8*c* are respective plan views of two lenses according to the invention, showing possible configurations for the principal vision zone 10 and the secondary vision zone 20. In both cases, the principal vision zone 10 comprises a disk which is centred overall with respect to the peripheral edge 30, and an angular sector of pi radians around this disk, extending radially from the latter up to the edge 30. The secondary vision zone 20 occupies the complementary angular sector.

In the configuration of FIG. 8*b*, the angular sector of the zone 10 is located at the top of the lens, with respect to the usual position of the latter in use. The secondary vision zone 20 is then located at the bottom of the lens. In this case, the zone 10 may be dedicated to far-vision correction and the zone 20 may contain two series of regions which may be dedicated respectively to far-vision and near-vision correction. Lenses 1, 3 and 4 of Table 1 may have such a configuration.

The configuration of FIG. 8*c* is deduced from that of FIG. 8*b* by exchanging the respective positions of the angular sectors occupied by the zones 10 and 20. The principal vision zone 10 now occupies the central disk and the lower angular sector, and the secondary vision zone 20 occupies the upper angular sector. The zone 10 may be dedicated to near-vision correction, and the far and near vision may be corrected simultaneously in the zone 20.

For the two configurations of FIGS. 8*b* and 8*c*, the regions of each series inside the secondary vision zone 20 may be semicircular strips which alternate from the disk belonging to the region 10.

Figure 8D:
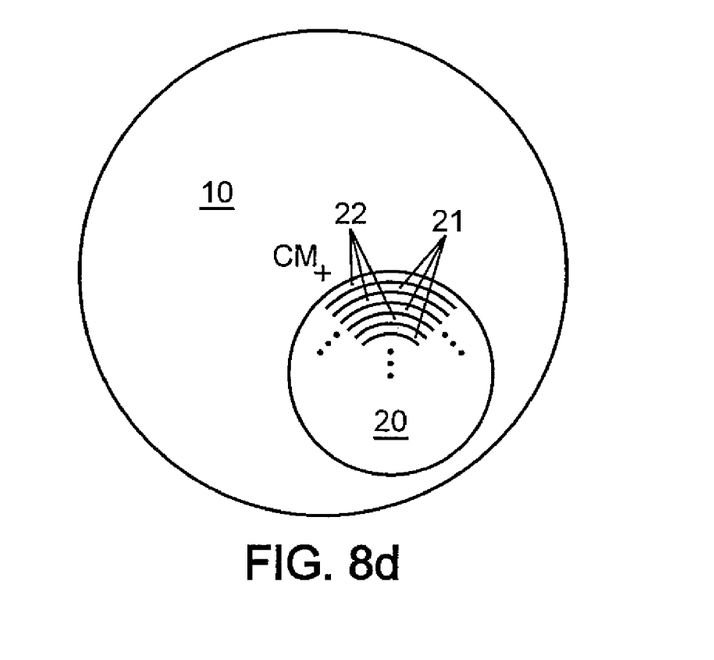

Finally, FIG. 8*d* also shows another configuration of a lens according to the invention, according to which the secondary vision zone 20 is a disk which is offset with respect to the fitting cross FC of the lens. The principal vision zone 10 then occupies the remainder of the surface of the lens. Lenses 1, 3 and 4 of Table 1 may also have this configuration.

It is understood that the invention can be implemented by modifying the numerical values given in the above detailed description, as well as the variations which are shown by the diagrams in the attached figures. Similarly, the principal vision zone, the secondary vision zone, and the regions of each series may have shapes different from those which have been described.

Moreover, it is understood that the principal vision zone, the secondary vision zone, and the series of regions may be defined by an intermediate surface of the lens. For this purpose, the lens may be constituted of two transparent elements which are constituted by respective materials having different light refractive indices. These two lens elements are joined according to the intermediate surface, with complementary shapes.

The invention claimed is:

1. A method for producing a multifocal ophthalmic eyeglass intended for a presbyopic wearer, comprising the steps of:

/1/ obtaining a first ophthalmic correction of the wearer for a first vision distance, and at least two second ophthalmic corrections of said wearer respectively for at least two second vision distances, said two second corrections being different from each other;

/2/ determining a principal vision zone and a secondary vision zone of the eyeglass;

/3/ dividing the secondary vision zone into at least two series of regions, said regions being contiguous and alternating with respect to said series with a pitch of less than or equal to 1 mm, wherein each one of the series of regions comprises at least two regions separated from each other by at least one region of the other series of regions;

/4/ determining the first parameters of the eyeglass in the principal vision zone, corresponding to the first ophthalmic correction, and, for each series of regions, determining second parameters of said eyeglass in the regions of said series as a function of one of the second ophthalmic corrections obtained in step /1/ and assigned to said series of regions; and /5/ producing the eyeglass according to said first and second parameters.

2. The method according to claim 1, wherein the principal vision zone and the regions of each series are determined by variations of at least one parameter of one and same surface of the eyeglass.

3. The method according to claim 1, wherein a size and/or a position of the principal vision zone in the eyeglass is determined in step /2/ as a function of an activity of the wearer using the first vision distance.

4. The method according to claim 1, wherein step /2/ comprises the following sub-steps:

/2-1/ characterizing an amplitude of a head movement of the wearer, performed when said wearer successively views objects located in different directions; and /2-2/ determining a size of the principal vision zone of the eyeglass such that said size of the principal vision zone decreases as a function of the amplitude of the head movement characterized for the wearer.

5. The method according to claim 1, wherein the principal vision zone of the eyeglass, in which the parameters of said eyeglass correspond to the first ophthalmic correction, contains a disk with a radius of 1 mm.

6. The method according to claim 1, wherein a proportion, in the secondary vision zone of the eyeglass, of the regions of at least one series selected from the series of regions used in step /3/, is determined as a function of an activity of the wearer using the second vision distance assigned to the selected series.

7. The method according to claim 1, wherein a proportion, in the secondary vision zone of the eyeglass, of the regions of at least one series selected from the series of regions used in step /3/, is determined as a function of an amplitude of a head movement performed by the wearer when said wearer successively views objects located in different directions, so that a quotient of a sum of surfaces of regions of the selected series divided by a surface of a corresponding part of the secondary vision zone increases as a function of the amplitude of the head movement performed by the wearer.

8. The method according to claim 1, wherein the regions of each series are strips arranged in an angular sector around at least a part of the principal vision zone of the eyeglass, and alternating along radial directions from said part of the principal vision zone towards a peripheral edge of the eyeglass.

9. The method according to claim 6, wherein the regions of each series are strips arranged in an angular sector around at least a part of the principal vision zone of the eyeglass, and alternating along radial directions from said part of the principal vision zone towards a peripheral edge of the eyeglass, wherein the strips of the regions of each selected series have respective fixed widths along radial directions in the secondary vision zone of the eyeglass, and wherein the proportion of the regions of said selected series in said secondary vision zone is determined by selecting at least one value for the alternating pitch of the strips of regions with respect to the series.

10. The method according to claim 6, wherein the regions of each series are strips arranged in an angular sector around at least a part of the principal vision zone of the eyeglass, and alternating along radial directions from said part of the principal vision zone towards a peripheral edge of the eyeglass, wherein the strips of the regions are alternating with respect to the series with a fixed pitch value along the radial directions in the secondary vision zone of the eyeglass, and wherein the proportion of the regions of said selected series in said secondary vision zone is determined by selecting at least one value for a period ratio of the strips of regions of the selected series.

11. The method according to claim 1, wherein the regions of one of the series each have at least one dimension comprised between 15 μm and 1000 μm.

12. The method according to claim 1, wherein the secondary vision zone is divided into two series of regions, and wherein the first vision distance and one of the second vision distances are equal, with one of the second vision distances greater than 2 m, and the other second vision distance comprised between 0.3 m and 0.5 m, or between 0.5 m and 2 m.

13. The method according to claim 1, wherein the secondary vision zone is divided into three series of regions, and wherein the first vision distance and one of the second vision distances are equal, with one of the second vision distances comprised between 0.3 m and 0.5 m, another one of the second vision distances comprised between 0.5 m and 2 m, and a last one of the second vision distances greater than 2 m.

14. The method according to claim 4, wherein the amplitude of the head movement performed by the wearer is characterized by performing the steps of:

measuring an angle of a rotation of the head of the wearer, when said wearer successively views two objects located in angularly separated directions; and determining a value of a gain from a quotient between the angle measured for the rotation of the head of the wearer on the one hand, and an angular distance between the two directions of view on the other hand, said gain varying as an increasing function or as a decreasing function of said quotient.

15. The method according to claim 1, wherein step /5/ comprises the following sub-steps:

/5-1/ selecting a semi-finished eyeglass, of which one of a front face and a rear face of said semi-finished eyeglass determines a principal vision zone and a secondary vision zone, said secondary vision zone being divided into at least two series of regions contiguous and alternating with respect to said series with a pitch of less than or equal to 1 mm, said semi-finished eyeglass setting differences between ophthalmic corrections produced respectively in the principal vision zone and in each series of regions for a finished eyeglass produced from said semi-finished eyeglass; and /5-2/ machining the other one of the front face and the rear face of the semi-finished lens, so that the eyeglass produces the first ophthalmic correction in the principal vision zone.

16. The method according to claim 15, wherein a size and/or a position of the principal vision zone in the eyeglass is determined in step /2/ as a function of an activity of the wearer using the first vision distance, wherein the semi-finished eyeglass is selected at sub-step /5-1/ according to the size of the principal vision zone determined for the wearer, and/or the proportion determined for said wearer, of the regions of the selected series in the secondary vision zone.

17. The method according to claim 11, wherein the regions of one of the series each have at least one dimension comprised between 25 μm and 50 μm.

* * * * *